Sept. 22, 1970  R. S. LUNDIN  3,530,311
VOLTAGE CONTROL MEANS FOR SOLID STATE AC RELAY ELECTRONIC
Filed March 3, 1967

INVENTOR.
Robert S. Lundin
BY
Mattern, Ware & Davis
ATTORNEYS.

United States Patent Office 3,530,311
Patented Sept. 22, 1970

3,530,311
VOLTAGE CONTROL MEANS FOR SOLID STATE AC RELAY ELECTRONIC TIMER
Robert S. Lundin, Thomaston, Conn., assignor to General Time Corporation, Stamford, Conn., a corporation of Delaware
Filed Mar. 3, 1967, Ser. No. 620,316
Int. Cl. H03k *17/00, 17/28*
U.S. Cl. 307—252                                        10 Claims

ABSTRACT OF THE DISCLOSURE

A solid state AC relay comprising a diode bridge circuit connected in series with an AC load across an AC power line. A silicon-controlled rectifier is connected across the bridge circuit such that when the rectifier is in its conducting state, full wave alternating current power is supplied to the load. A novel direct current supply for the silicon-controlled rectifier is derived from the same power line without the use of a transformer. A Zener diode is connected in parallel with a transistor and biasing resistors for controlling the gate of the SCR and insures that over voltages are not applied either to the SCR or to the transistor. The electronic timer derives its DC power from across the Zener diode. The timer comprises a resistor-capacitor bridge charging circuit having a transistor detector connected across it. A diode is connected intermediate of one arm of the bridge and to the capacitor for precharging the capacitor on initiation of a timing function. A diode is connected in series with the transistor junction to protect it against reverse bias.

Figure 1:
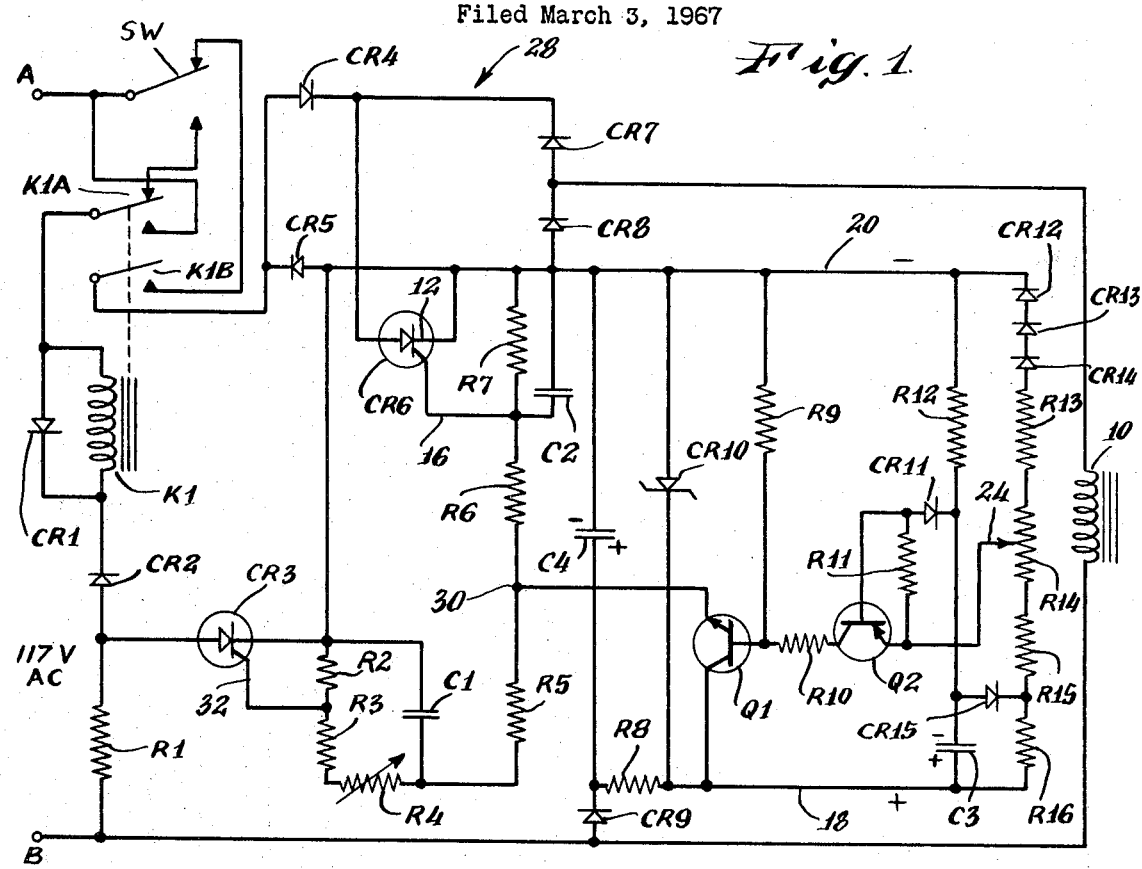

A multiple interval timer utilizing the above. A self-holding relay is initially energized upon transfer of a transfer switch. The timer is energized upon retransfer of the switch. At completion of the timer interval an output load is energized through the SCR controlled alternating current relay. The signal that initiates conduction of the SCR is passed through a delay device. After a delay, it energizes a second SCR which shorts out the first relay to discontinue energization of it and the load. A plurality of diodes are incorporated into one arm of the bridge circuit and compensate for the temperature dependence of the junction potentials of the previously mentioned semiconductor.

BACKGROUND OF THE INVENTION

This invention relates to solid state AC relays and to electronic timers employing the same. More particularly, it relates to a completely solid state transformerless AC timer for controlling an AC load. The AC load is energized for a short period of time a predetermined time interval after the cycling of a transfer switch.

Such a multi-interval timer typically requires an initially energized relay having a pair of holding contacts to keep it energized until completion of the timing function and, the output load (which is typically a relay) may only be energized with half-wave rectified alternating current. If it is desired to supply the load with full-wave rectified alternating current, such a timer would be greatly complicated according to the prior art. If it is desired for the purposes of reliability and long life to use all solid state components, one might use, for example, the full wave phase controlled alternating current switch using a single silicon-controlled rectifier (SCR) as disclosed on page 94 of the 1960 1st edition of the General Electric Controlled Rectifier Manual. This circuit comprises four diodes connected into a bridge circuit such that they conduct full wave rectified power to a load when an SCR connected across the bridge is in its conducting state. However, such a circuit cannot be used if the load impedance is low with respect to the impedance controlling the SCR gate when the SCR is turned off. Under these conditions, high voltage will be applied across the gate control which in an all solid state circuit would be a transistor or other semiconductor device and the device would break down.

According to the prior art, in order to utilize an SCR controlled diode bridge circuit for controlling full wave alternating current to a low impedance load, a transformer would have to be used to couple the control circuit to the SCR. This transformer would greatly increase the cost of such a timer and would, in fact, make it impractical.

Electronic timers are widely utilized in original manufacturer's equipment and an example of this is the photocopy machine. These machines are subjected to wide variations in temperature. One of the problems of proir art electronic timers which utilize a resistor-capacitor bridge circuit and a semiconductor detector is that the intrinsic junction potential of the semiconductor junctions decreases with rising temperature and these decreases greatly affect the timer accuracy.

A multiple timer may use as the secondary interval timer a capacitor discharging holding circuit to keep a relay self-energized for a predetermined time after power is removed from it. This circuit has the disadvantage that it is dependent upon the dropout voltage of the relay and a relatively large capacitor must be employed. Because of the large capacitor's large leakage, current and other effects, this provides a somewhat inaccurate time base.

It is, therefore, an object of the present invention to provide an improved solid state alternating current relay.

Another object of the invention is to provide a relay of the above character for controlling a low impedance load.

Still another object of the invention is to provide a relay of the above character employing a diode rectifier bridge controlled by a silicon-controlled rectifier gated by a semiconductor device which is protected against excessive voltages due to the lower impedance of the load.

A still further object of the invention is to provide a relay of the above character deriving its gate power from the alternating current line to which it is connected.

Another object of the invention is to provide a relay of the above character in which the control device for the relay derives its power from the same source as the relay.

Still another object of the invention is to provide an electronic timer insensitive to variations in ambient temperature.

Yet another object of the invention is to provide an electronic timer providing switching at multiple intervals.

Another object of the invention is to provide an electronic timer of the above character that is completely solid state, transformerless, and insensitive to ambient temperature variations.

Still another object of the invention is to provide an electronic timer of the above character providing a highly accurate secondary time base.

A still further object of the invention is to employ the alternating current relay of the above character in an electronic timer of the above character that is, inexpensive, rugged and reliable.

Other objects of the invention will in part be obvious and will in part appear hereinafter.

Figure 2:
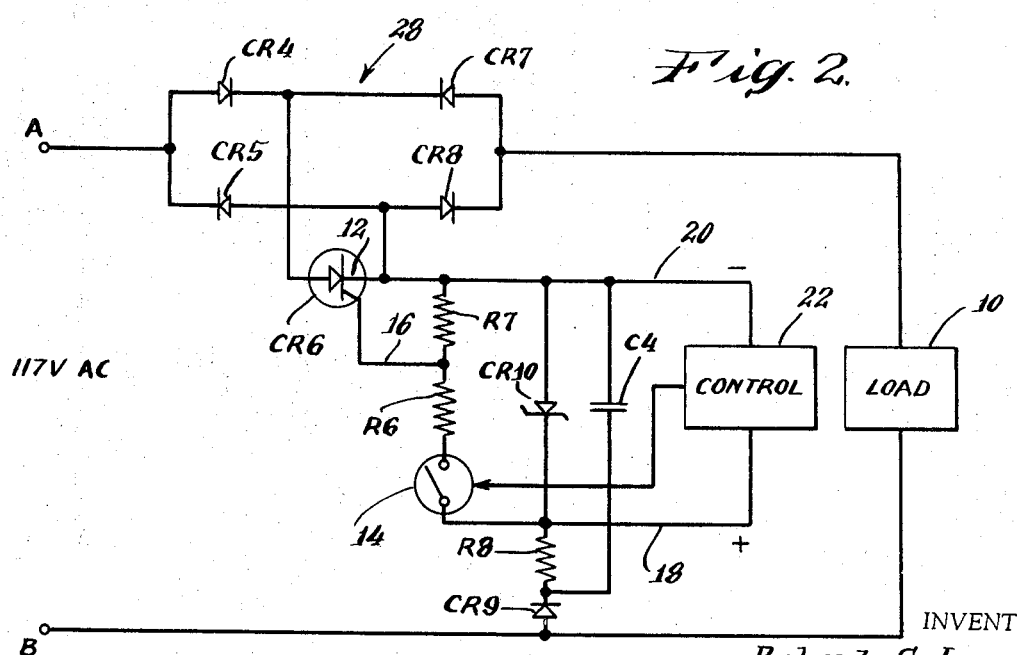

For a fuller understanding of the nature and objects of the invention, reference should be had to the following detailed description taken in connection with the accompanying drawing, in which:

FIG. 1 is a schematic electrical circuit diagram of a multi-internal timer employing the solid state alternating current relay of the invention; and, FIG. 2 is a schematic electrical circuit diagram, partly in block form, of the solid state alternating current relay according to the invention.

One aspect of the invention is illustrated in FIG. 2. The full wave alternating current solid state relay, shown therein, comprises four diodes, CR4, CR5, CR7 and CR8, connected into a bridge circuit 28 with an SCR CR6 such that when the SCR conducts, full wave alternating current is supplied to load 10. As will be understood by those skilled in the art, when load 10 is a low impedance, relatively high voltages may be applied between the cathode 12 of SCR CR6 and the alternating current terminal B. In an all solid state device, these high voltages, according to prior art, would break down the semiconductor switch 14 controlling the gate 16 of the SCR CR6. This is avoided in the present invention by connecting Zener diode CR10 in series with resistor R8 and diode CR9, between the cathode 12 and the AC terminal B. Since the voltage across the Zener diode CR10 is fixed, most of the high voltage will appear across resistor R8. The transistor 14 and the SCR CR6 thus will be protected against over voltages. Capacitor C4 is the filter capacitor for this direct current supply. The DC thus appearing between positive bus 18 and negative bus 20 may also be used to supply a control 22 which furnishes the control signals to semiconductor switch 14.

Another aspect of the invention is the employment of three compensating diodes, CR12, CR13, and CR14, in FIG. 1. These diodes are employed in the timer bridge circuit formed by resistors, R12, R13, R15 and R16, potentiometer R14, and capacitor C3. The capacitor C3 is precharged through a diode CR15 at the beginning of a timing interval to a fixed low voltage to increase the timer accuracy. Transistor Q2 is connected across the bridge and detects the full charge on capacitor C3. The emitter to base junction of transistor Q2 is protected by diode CR11, connected in series with it. I have found that the three junctions of diodes CR11 and CR15, and the emitter to base junction of transistor Q2 act together to reduce the timing interval when the temperature increases. This occurs because each junction's intrinsic junction potential decreases upon rising temperature. Thus, an increase in temperature will increase the initial charge on capacitor C3 through diode CR15. Similarly, the effect of temperature on diode CR11 and on the emitter to base junction of transistor Q2 causes transistor Q2 to conduct when capacitor C3 is charged to a lower value. I, therefore, connect diodes CR12, CR13 and CR14 into the bridge circuit. These diodes have the same temperature characteristics as the junction of diodes CR11, CR15 and transistor Q2. Thus, increasing temperature reduces the voltage between negative direct current bus 20 and terminal 24 of potentiometer R14. This means that transistor Q2 will not conduct until capacitor C3 is charged to a higher value than if diodes C12, C13 and C14 were not present. The two effects are opposite each other and substantially cancel so that the timer thus formed is substantially insensitive to temperature variations.

The load 10 in the timer of FIG. 1 is a low impedance solenoid. When the switch SW is transferred, a circuit is completed through its normally open contacts and the normally closed relay contacts K1A to energize relay K1 with half-wave rectifier. Energization of relay K1 completes a holding path through the normally open contacts K1A to keep it energized. Simultaneously, contacts K1B close a circuit to supply power to the diode bridge, generally indicated at 28, through the normally closed contacts of switch SW when it is retransferred. DC power is then applied to the timing portion of the circuit from alternating current terminal B through diode CR9, resistor R8, Zener diode CR10 and diode CR5. The resulting fixed direct current potential between positive direct current bus 18 and negative bus 20 causes the bridge circuit timer to time out. The signal then supplied from transistor Q2 causes emitter follower transistor Q1 to conduct and the signal thus passes through resistors R6 and R7 to the gate 16 of SCR CR6. The load 10 is thus energized through SCR CR6 with full wave alternating current power. The signal from transistor Q1 is also supplied to a delay network formed of capacitor C1 and the associated resistors, R3 and R4 (R4 being adjustable to adjust the delay). After a predetermined delay, SCR CR3 is energized. Relay K1 is thereby shorted out by a path from terminal B through resistor R1, SCR CR3, diode CR5, relay contacts K1B, and switch SW, to terminal A. Relay K1 de-energizes removing power from the bridge circuit 28 by opening the contacts K1B, de-energizing load 10.

Turning now to a more detailed description of FIG. 1, in order that it may be energized with half-wave rectified alternating current, relay K1 has a diode CR1 connected thereacross for self-energization during the negative half cycles of the power line. During the positive half cycles, it is supplied with power through diode CR2. Resistor R1 limits the current between terminals A and B when relay K1 is shorted out by SCR CR3 and diode CR5. As previously stated, when switch SW is transferred, closing its normally open contacts, relay K1 energizes. Other loads may also be energized by transfer of the switch SW and relay K1 may have other load controlling contacts. When switch SW is returned to its normal position, relay K1 remains energized through its normally open holding contacts K1A and the normally closed contacts of switch SW. Additionally, power is now supplied through normally open relay contacts K1B to the timer portion of the circuit.

The SCR CR6 is initially in its OFF condition. However, one leg of the bridge 28 is used to supply power to the timer circuit via diodes CR9, resistor R8, Zener diode CR10 and diode CR5 of the bridge.

The DC voltage between buses 18 and 20 is limited to the breakdown potential of the Zener CR10. Capacitor C3 is precharged through diode CR15. Thereafter, it charges through resistor R12. The interval until detection, when transistor Q2 conducts, may be varied by adjusting potentiometer R14. When transistor Q2 conducts, current flows from the positive bus through resistors R16, R15, the lower portion of potentiometer R14, the emitter and collector of transistor Q2, resistor R10 and resistor R9. The base of emitter follower transistor Q1 now becomes positive enough to cause it to conduct and this signal is supplied through resistors R6 and R7 to the gate 16 of SCR CR6. The SCR conducts, energizing the load 10.

The SCR gate 16 is bised by resistor R7 and protected against transients by capacitor C2, as explained in the above-identified applications. The signal supplied to terminal 30 from emitter follower Q1 charges capacitor C1 through resistor R5. The rate of charging capacitor C1 is adjusted by adjusting variable resistor R4. When the charge on capacitor C1 reaches a high enough value, the potential on the gate 32 of SCR CR3 becomes high enough to cause SCR CR3 to conduct. It will be noted that capacitor C1 furnishes transient protection to SCR CR3.

When SCR CR3 conducts it shorts out relay K1 through resistor R1 and diode CR5, as previously described. Relay K1 de-energizes, opening its contacts K1B, discontinuing the power to the timer and to the lead 10.

Capacitor C4 acts as the filter capacitor for the DC portion of the circuit.

An electric timer for use in a photocopy machine utilizes the following components: Diodes CR1, CR2, CR4, CR5, CR7, and CR8 are each types DE200; diode CR9, type DE300; and diodes CR12, CR13 and CR14, each type DE50; all supplied by Semiconductor Products. SCR's CR3 and CR6 are each General Electric type C106B. Zener diode CR10 is a ZA30. Diode CR11 is an IN461, as is diode CR15. Transistor Q1 is a 2N3705 and transistor Q2, a 2N4248. Capacitor C1 is a 10 microfarad, 25 volt capacitor; capacitor C2, 0.1 microfarad, 10 volt capacitor; capacitor C3 a 5 microfarad, 20 volt capacitor; and capacitor C4 a 10 microfarad, 200 volt electrolytic filter capacitor. Resistor R1 is a 1 kilohm, 2 watt resistor. Resistor R2 is a 1 kilohm, one-half watt resistor. Resistor R3 is a 33 kilohms, one-half watt resistor. Variable resistor R4 takes the form of a 10 kilohms, 2 watt potentiometer. Resistor R5 is 4.7 kilohms; resistor R6, 10 kilohms; resistor R7, 1 kilohm; resistor R9, 47 kilohms; resistor R10, 10 kilohms; resistor R11, 470 kilohms; resistor R12, 100 kilohms; resistor R13, 1 kilohm; resistor R15, 500 ohms; resistor R16, 680 ohms; all rated at one-half watt. Resistor R8 is a 3.9 kilohm, 5 watt resistor. Potentiometer R14 is a 1 kilohm, one-half watt potentiometer. Relay K1 is a 117 volt alternating current relay and the load 10 is a 10 watt alternating current solenoid.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. In a solid state relay comprising a diode bridge for receiving alternating current from one terminal of an A-C supply line and supply current to a load which, in turn, is connected to the other terminal of said alternating current supply line, and a controlled rectifier having a pair of controlled electrodes connected across said bridge such that the bridge will supply full wave rectifier alternating current to the load when the controlled rectifier is in its conducting state, said controlled rectifier also having a gate electrode, the improvement comprising:
   (A) a diode;
   (B) a resistance; and
   (C) a voltage limiting device
       (a) said diode, resistance and voltage limiting device connected in series between a controlled electrode of said controlled rectifier and said other terminal of said A-C. supply line.
2. The improvement defined in claim 1, and:
   (D) an electronic switching device connected in series with said resistance and the gate electrode of said controlled rectifier.
3. The improvement defined in claim 1 wherein said voltage limiting device is a Zener diode.
4. The improvement defined in claim 2 wherein said electronic switching device is a semiconductor switch.
5. The improvement defined in claim 4 wherein said semiconductor switch is a transistor.
6. The improvement defined in claim 1 including a capacitance connected in parallel across said resistance and said voltage limiting device.
7. The improvement defined in claim 2 including a control device connected in parallel across said voltage limiting device and in circuit with and for controlling said electronic switching device.
8. The improvement defined in claim 7 wherein said control device is an electronic timer.
9. The improvement defined in claim 8 wherein said timer comprises a resistor-capacitor bridge charging circuit having at least one semiconductor device operatively connected thereto, and at least one semiconductor junction is connected into the bridge circuit for the purpose of compensating for the temperature dependence of the junction potentials of said semiconductor devices.
10. The improvement defined in claim 1 wherein said controlled rectifier is a silicon-controlled rectifier.

References Cited

UNITED STATES PATENTS

| | | | |
|---|---|---|---|
| 3,195,029 | 7/1965 | Gilbreath | 307—252 X |
| 3,331,013 | 7/1967 | Cunningham | 307—252 X |
| 3,333,175 | 7/1967 | Klyce | 307—252 X |
| 3,440,445 | 4/1969 | Kusa | 307—252 |
| 3,215,851 | 11/1965 | Warnock | 307—237 |
| 3,244,965 | 4/1966 | Gutzwiller | 307—252 X |
| 3,252,010 | 5/1966 | Buttenhoff | 307—252 |
| 3,282,631 | 11/1966 | Mosinski | 328—129 X |
| 3,328,606 | 6/1967 | Pinckaers | 307—252 |

JOHN S. HEYMAN, Primary Examiner

S. D. MILLER, Assistant Examiner

U.S. Cl. X.R.

307—202, 293, 305; 317—131, 142; 328—129